United States Patent [19] [11] 4,431,201
Morisaki [45] Feb. 14, 1984

[54] CHUCK WITH CENTRIFUGAL COMPENSATION DEVICE

[75] Inventor: Eiichi Morisaki, Nagoya, Japan

[73] Assignee: Howa Kogyo Kabushiki Kaisha, Nagoya, Japan

[21] Appl. No.: 244,325

[22] Filed: Mar. 16, 1981

[30] Foreign Application Priority Data

Mar. 31, 1980 [JP] Japan .................................. 55-42467

[51] Int. Cl.³ ............................................ B23B 31/14
[52] U.S. Cl. ..................................... 279/1 C; 279/110
[58] Field of Search .............. 279/1 C, 110, 119, 121

[56] References Cited

U.S. PATENT DOCUMENTS

| 2,657,068 | 10/1953 | Sloan |
| 2,729,459 | 1/1956 | Leifer |
| 2,828,134 | 3/1958 | Buck |
| 2,982,558 | 5/1961 | Multer |
| 3,370,859 | 2/1968 | Benjamin et al. |
| 3,984,114 | 10/1976 | Ovanin |
| 4,047,723 | 9/1977 | Buck |
| 4,078,814 | 3/1978 | Rohm | 279/1 C |
| 4,275,892 | 6/1981 | Rohm | 279/1 C |

FOREIGN PATENT DOCUMENTS

| 2132130 | 1/1973 | Fed. Rep. of Germany ...... 279/1 C |
| 2542562 | 4/1977 | Fed. Rep. of Germany ...... 279/1 C |
| 2611923 | 9/1977 | Fed. Rep. of Germany ...... 279/1 C |
| 2915854 | 10/1979 | Fed. Rep. of Germany ...... 279/1 C |
| 52-119581 | 3/1976 | Japan . |
| 51-118181 | 10/1976 | Japan . |
| 51-045176 | 10/1976 | Japan . |

Primary Examiner—William R. Briggs
Assistant Examiner—Thomas M. Kline
Attorney, Agent, or Firm—Wenderoth, Lind & Ponack

[57] ABSTRACT

A centrifugal force compensation device in a wedge-type balanced rotary chuck having jaws comprises, for each jaw, a balance weight and means for doubling the centrifugal force acting on the balance weight and applying the doubled force to the back face of that jaw near the outer periphery thereof thereby to press forward the jaw and impart thereto a moment urging it to rotate inward toward the chuck axis, whereby the so-called jaw flotation phenomenon is countered and prevented and, simultaneously, the reduction in chuck gripping force due to centrifugal force is compensated for.

5 Claims, 9 Drawing Figures

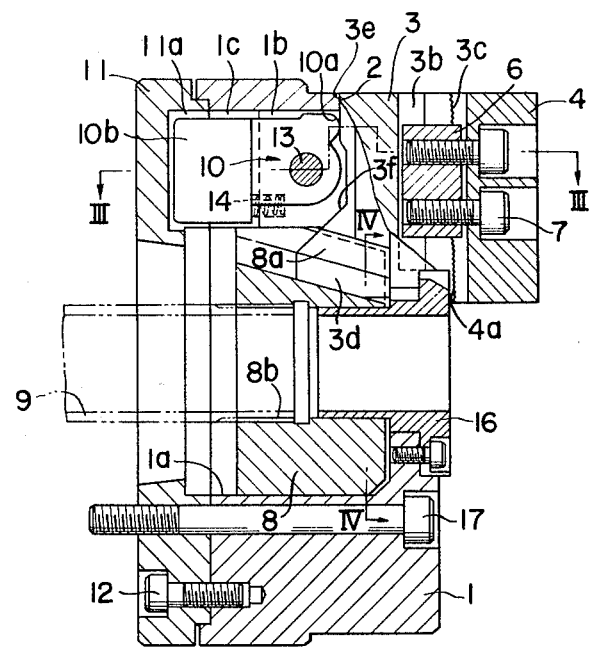

CHUCK WITH CENTRIFUGAL COMPENSATION DEVICE

BACKGROUND OF THE INVENTION

This invention relates generally to rotary chucks having jaws for gripping and holding workpieces and rotating together with the workpieces thus held. More particularly, the invention relates to a new balanced chuck in which centrifugal force acting on the jaws (combinations of two jaws comprising a master jaw and a top jaw collectively referred to herein as "jaws") is compensated for.

For reducing machining times and lowering production cost in machine tool operations, it is desirable to increase the rotational speeds of chucks. However, when a chuck is rotated at high speed, centrifugal force arising from the rotation acts on the jaws and decreases their gripping force on the workpiece. For example, the inventor has measured this decrease in gripping force in connection with an increase in the chuck rotational speed with respect to a wedge-type chuck of 160-mm outer diameter generally called a six-inch chuck. As a result, it was found that a rapid decrease in the gripping force begins to occur when a speed of 2,000 rpm is exceeded, and at 4,000 rpm and higher speeds, the gripping force of the chuck jaws is decreased to an extent such that their capability of properly holding the workpiece being machined even becomes doubtful.

Heretofore, numerous proposals relating to countermeasures for solving this problem arising from the action of centrifugal force on chuck jaws have been made. For example, in one type, which may be called the rear-weight type balanced chuck, balance weights are slidably fitted in a manner permitting them to slide in the radial direction in weight-mounting slots in the rear side, with respect to the axial direction, of the chuck body facing the master jaws as disclosed in Japanese Unexamined Utility Model Laid-Open Publication No. 119581/1977, and U.S. Pat. Nos. 2,729,459, 2,657,068, and 4,047,723. In another type, which may be called the side-weight type balanced chuck, balance weights are respectively provided for the master jaws, on one side, with respect to the circumferential direction, or on both sides of each jaw, and are coupled by levers as disclosed in Japanese Unexamined Utility Model Laid-Open Publn. No. 45176/1976, and U.S. Pat. Nos. 2,828,134 and 2,982,558. In still another type, which may be called the crank-weight type balanced chuck, balance weights are mounted on ends of crank levers for actuating respective master jaws as disclosed in Japanese Unexamined Pat. Laid-Open Publn. No. 118181/1976 (corresponding to U.S. Pat. No. 3,984,114) and U.S. Pat. No. 3,370,859.

In each of these balanced chucks of the prior art, centrifugal forces acting on counterbalance weights are utilized to exert forces which are directed inward toward the chuck centerline on the jaws and are substantially equal to the centrifugal forces which are directed in the radial outward direction on the jaws and are thereby balanced, whereby the outward centrifugal forces acting on the jaws are substantially canceled.

The decrease in gripping force of the chuck jaws due to centrifugal force acting thereon will now be considered with respect to a chuck wherein jaws actuated to slide inward toward the chuck axis by a fluid-pressure cylinder-piston mechanism grip a workpiece, and each master jaw has a fitting part fitted in a master jaw mounting slot formed in the chuck body. When centrifugal force arising from rotation of the chuck acts on the jaws, a moment acts on each jaw tending to rotate it away from the chuck axis about the center of the above mentioned fitting part and to cause the front inner end of the jaw to float away from the chuck axis. This is commonly called a "flotation phenomenon" resulting in an elastic deformation of the jaw, which causes a reduction by that much of the jaw gripping force. Since this flotation phenomenon occurs within the range of elastic deformation of each jaw, the jaw is restored to its original state and, theoretically, the gripping force returns to its first-applied initial value when the rotation of the chuck is stopped.

However, in a conventional balanced chuck wherein the force of each balance weight due to centrifugal force is directed toward the chuck axis, the jaws are merely pushed radially inwardly toward the chuck axis at the above mentioned fitting part of the master jaw. For this reason, the jaw is pushed back toward the chuck axis in a state wherein the flotation phenomenon is sustained as it is or, rather, is even augmented, and the centrifugal force acting on the jaw is nullified by increasing the first-applied initial gripping force by the force of the balance weight in order to accomplish gripping force compensation.

Consequently, when the chuck rotation is stopped, only the gripping force corresponding to the decrease in the gripping force due to the flotation phenomenon returns to its original value, and the final gripping force is increased over the first-applied initial gripping force by the force quantity compensated for by the force of the balance weight. As described more fully hereinafter, the inventor has carried out tests on conventional balanced chucks and has found that this increase of the final gripping force over the first-applied initial gripping force ranges from 40 percent to 100 percent or even more.

Thus, the jaws of a conventional balanced chuck grip the workpiece with a tremendous gripping force after completion of a machining operation on the workpiece. Therefore balanced chucks of this character cannot be used for gripping workpieces requiring high machining precision or those having thin walls. The use of these chucks, moreover, is limited because of deformation of the workpiece after machining particularly with respect to die-cast and copper articles and castings of light alloys such as those of aluminum in spite of the fact that these articles require high cutting speeds in machining. If, in consideration of this deformation after machining, a small initial gripping force is first applied to the workpiece, the gripping force during rotation will become too small as a natural consequence, and heavy machining will become impossible.

Accordingly, the balanced chucks of the prior art can be used for holding only workpieces such as bars and articles to undergo rough machining, for example, in the machining of which deformation after the machining operation is not a problem. Consequently, the use of these chucks is limited.

SUMMARY OF THE INVENTION

It is an object of this invention to overcome the above described difficulties encountered in the prior art by providing a balanced chuck characterized by a centrifugal force compensation device for compensating for the centrifugal force acting on the jaws which is so designed that, during rotation, forces due to centrifugal force acting on balance weights are applied to the back faces of master jaws near the outer periphery thereof thereby to press the master jaws axially forward and compensate for the centrifugal force acting on the jaws gripping the workpiece and that, when the rotation is stopped, the gripping force of the jaws returns to the initial gripping force, whereby deformation of the workpiece is prevented.

According to this invention, briefly summarized, there is provided a rotary chuck having a chuck body and a jaw mechanism. The jaw mechanism includes a plurality of jaws or jaw means each jaw comprising a master jaw slidably supported by the chuck body to slide in the radial direction relative to the axis of rotation of the chuck body in accordance with actuation thereof and a top jaw secured to the master jaw in front thereof and moving together therewith in the radial direction, the jaw mechanism also including centrifugal force compensation means including, for each jaw means, a balance weight for compensating for centrifugal forces acting on the jaw means during rotation of the chuck, said chuck being characterized in that said balance weight is associated with force transmitting means for transmitting forces arising from the centrifugal force acting on the weight, in a forward direction substantially parallel to the axis of rotation, to the back face of the master jaw of that jaw means near the radially outer periphery thereof thereby to press forwad the jaw means and thereby to impart a moment thereto urging the jaw means to rotate inward toward the axis of rotation.

The nature, utility, and further features of this invention will be more clearly apparent from the following detailed description with respect to preferred embodiments of the invention when read in conjunctin with the accompanying drawings, briefly described below.

BRIEF DESCRIPTION OF THE DRAWINGS

In the drawings

FIG. 2 is a side view, in longitudinal section along planes parallel to the chuck centerline, of the same chuck;

FIG. 3 is a fragmentary sectional view taken along planes indicated by line III—III in FIG. 2 as viewed in the arrow direction;

FIG. 4 is a cross-sectional view taken along the plane indicated by line IV—IV in FIG. 2 as viewed in the arrow direction;

DETAILED DESCRIPTION OF THE INVENTION

Figure 8:
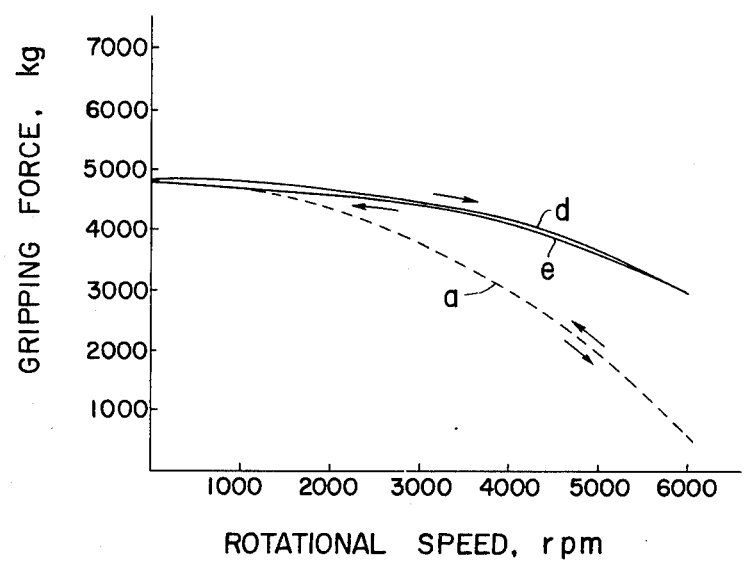
FIG. 8 is a graph indicating the relationship between rotational speed and gripping force of a 6-inch chuck as illustrated in FIGS. 1 through 4.
Figure 9:
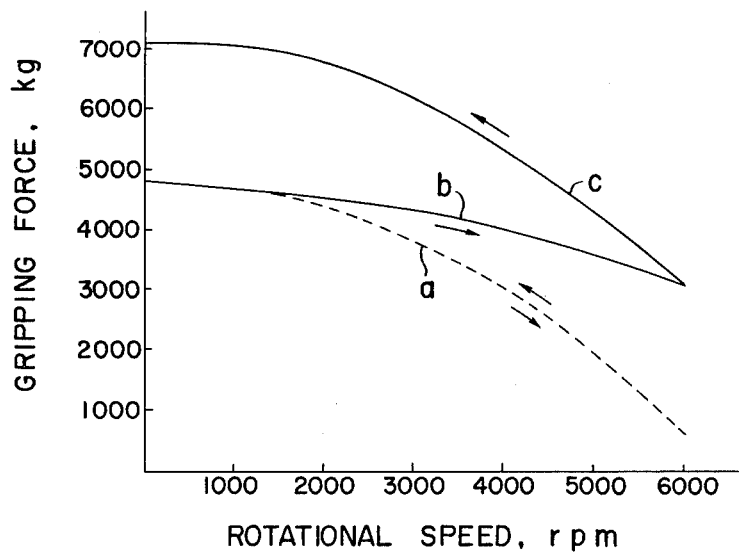
FIG. 9 is a similar graph indicating the relationship between rotational speed and gripping force of a 6-inch chuck known in the prior art.

As conductive to a full understanding of this invention, relationships between gripping force and rotational speeds of rotary chucks will first be briefly considered with reference to FIGS. 8 and 9 indicating results from actual tests. In both graphs of FIGS. 8 and 9, the curve a is that of the six-inch (160-mm) chuck of wedge type mentioned hereinbefore, which is not balanced. This curve a indicates that, when a speed of 2,000 rpm is exceeded, a rapid decrease in the gripping force begins to occur, and that the gripping force is reduced to almost an impractically low value at 4,000 rpm and higher speeds. In this chuck the relationship between gripping force and rotational speed follows the same curve a during increasing of the speed and during decreasing of the speed.

When a 6-inch, wedge-type balanced chuck of rear weight type mentioned hereinbefore (which is an embodiment of the invention of U.S. Pat. No. 4,047,723) was tested in the same manner, the curves b and c in FIG. 9 were obtained. Curve b indicates the decrease in gripping force as the speed was increased, while curve c indicates the return path of the increase in gripping force as the speed was decreased to zero speed, at which the final gripping force was approximately 50 percent greater than the initial gripping force.

As a result of similar tests on a great number of various other balanced chucks in wise use, it was found that the final gripping forces were 1.4 to 1.9 times the corresponding initial gripping forces. In the case of balanced chucks of the crank weight type (embodying the invention of U.S. Pat. No. 3,370,859) in which the weight of the balancing weights are increased so as to increase the gripping force as the rotational speed is increased, the final gripping force is more than twice the initial gripping force in some instances. These large ratios of the final gripping force to the initial gripping force give rise to the aforedescribed problems, which are effectively solved in the balanced chuck of this invention as will become apparent from the following description.

In the example of a wedge-type chuck constituting a preferred embodiment of this invention and having a hollow chuck body and a jaw mechanism mounted thereto, as illustrated in FIGS. 1 through 4, the front face (on the right in FIG. 2) of the hollow cylindrical chuck body 1 is provided in radial directions at equal angular intervals with a plurality (three in the illustrate example) of known master jaw mounting slots 2. In the opposite side walls of each of these mounting slots 2, opposite guide grooves 2a are formed as shown in FIG. 3. Master jaws 3 are fitted in respective mounting slots 2 in a manner permitting their sliding movement in the radial direction. Each master jaw 3 is provided with projections 3a respectively fitted in and guided by the guide grooves 2a. These projections 3a and guide grooves 2a function in combination to receive and resist moments due to centrifugal force when the jaws are rotated.

Each master jaw 3 is provided at its front part with a Tee-slot 3b, in cross section, formed by machining, in which a jaw nut member 6 is movably fitted. Serrations 3c of saw-tooth shape are formed on the front face of each master jaw 3 and mesh with corresponding serrations 4a on the rear face of a respective top jaw 4. Each top jaw 4 is fixed to its corresponding master jaw 3 by two bolts 7 screwed into the jaw nut member 6 thereby to constitute a unitary jaw 5. Furthermore, a sloping or tapered part 3d of Tee shape in cross section is formed at the inner end as viewed in the radial direction of each master jaw 3 as shown in FIG. 4.

A hollow wedge plunger 8 is fitted in axially slidable manner in a cavity 1a of the chuck body 1. Around the outer periphery of this wedge plunger 8, there are formed tapered grooves 8a, each of inverted Tee-shaped cross section, for slidably fitting therein respective Tee-shaped tapered parts 3d of the master jaws 3. The wedge plunger 8 has an axial bore of circular cross section having inner screw threads 8b with which outer screw threads on the front end of a draw tube 9 are meshed. This draw tube 9 is actuated in forward or rearward axial direction by the operation of a fluid-pressure actuated cylinder (not shown) which may be of compressed-air type or hydraulic type.

To the rear of the master jaw mounting slots 2 (on the left-hand side as viewed in FIG. 2), of the chuck body 1, weight mounting slots 1b communicating with the mounting slots 2 and weight accommodating chambers 1c communicating with the weight mounting slots 1b and, moreover, expanding outward in the peripheral direction, are provided. In the illustrated example, the weight accommodating chambers 1c are open at the rear surface of the chuck body 1. A rear plate 11 is provided with three weight accommodating recesses 11a formed therein at positions to correspondingly register with the weight accommodating chambers 1c and is secured to the rear face of the chuck body 1 by bolts 12, whereby closed weight housing chambers are formed.

Within each of these weight housing chambers is housed a counterweight or balance weight 10 pivotally supported by a weight pivot pin 13 on the chuck body 1 and having a weight body 10b to the rear of the pin 13 and a forwardly projecting pressing projection 10a. The balancing weight 10 has also a part of rectangular crosssection which is fitted in the aforementioned weight mounting slot 1b of the chuck body 1 and is free to pivot about the pivot pin 13 in a plane passing through the rotational axis of the chuck. A compression spring 14 is interposed in compressed state between a part of the chuck body 1 and the weight body 10b and continually exerts a force on the weight tending to cause the pressing projection 10a to be in pressing contact with the back face 3e of the corresponding master jaw 3 near the outer periphery thereof.

Since each balance weight 10 is continually held in this state and undergoes substantially no displacement, the weight body 10b accommodated in the weight accommodating chamber 1c requires only very small clearances there-around, and a stable centrifugal force is obtained thereby. While the spring 14 is provided for the purpose of causing the pressing projection 10a of the balance weight 10 to be in continual contact with the back face 3e of the master jaw 3, this spring may be omitted.

In order to effectively utilize the centrifugal force acting on each weight body 10b, the balance weight 10 is supported by the pivot pin 13 to be pivotable in a plane parallel to the centerline of the chuck body 1 as mentioned hereinabove and as indicated in FIG. 2 and is so designed that the distance from the center of gravity of the weight body 10b to the center of the pin 13 is substantially twice the distance from the center of the pin 13 to the outer tip of the pressing projection 10a. Thus, the centrifugal force acting on the balance weight 10 is substantially doubled and thus applied to press forwardly the back face 3e of the master jaw 3.

Furthermore, in order to cause the direction of this forwardly pressing force to be parallel to the centerline of the chuck body 1 as much as possible, the central part 3f of the back face of each master jaw 3 is recessed thereby to bring the weight pivot pin 13 near the master jaw. Each weight pivot pin 13 is retained in assembled state by a set screw 15 as shown in FIG. 3. A hollow-cover flange 16 is fixed to the central front face of the chuck body 1. Six mounting bolts 17 are inserted rearwardly through the chuck body 1 and the rear plate 11 to be screwed into corresponding tapped holes in a spindle (not shown) of the machine tool thereby to fix the chuck to the spindle.

When, as mentioned hereinabove, the draw pipe 9 is moved forward or rearward in the axial direction by the actuation of the fluid pressure cylinder, the Tee-shaped tapered groove 8a of each wedge plunger 8 and the Tee-shaped tapered part 3d of the corresponding master jaw 3 in mutually mated state undergo relative sliding movement. This results in a wedge action, whereby the master jaw 3 is moved outwardly or inwardly in the radial direction, and the top jaw 4 fixed to the master jaw 3 also moves outwardly or inwardly thereby to release or grip a workpiece.

When the master jaw 3 thus moves in the radial direction, the balancing weight 10, whose pressing projection 10a is in pressing contact with the back face 3e of the master jaw, remains unchanged in its state shown in FIG. 2 since the back face 3e is a smooth surface. When the master jaw 3 moves inwardly and the top jaw 4 grips the workpiece, the pressing projection 10a of the weight 10 is in pressing contact with the back face 3a at a point which is nearer to the outer periphery of the master jaw 3 by the distance of movement thereof from its state shown in FIG. 2.

Figure 7:
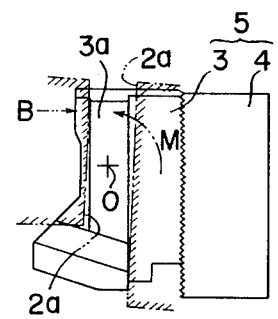
FIG. 7 is a side view indicating a state wherein a torque due to centrifugal force is being exerted on a jaw, thereby tending to cause the aforementioned flotation phenomenon.

When the chuck gripping the workpiece rotates, a moment M due to centrifugal force as indicated in FIG. 7 is imparted to each jaw 5 comprising the master jaw 3 and the top jaw 4 in intergral combination, whereby the aforedescribed so-called jaw-flotation phenomenon in which the outer end of the jaw "floats" radially outward tends to occur. As mentioned hereinbefore this moment M urges the jaw 5 to rotate outward (counterclockwise in FIG. 7) about a center O, which may be considered to be at the center of the projection 3a of the master jaw 3. (It should be mentioned that the explanatory view of FIG. 7 indicates the state wherein a moment B balance weight 10 described hereinbelow is not acting, that is, the state wherein the jaw-flotation phenomenon of the jaw 5 is occurring.)

At the same time, however, a centrifugal force due to the rotation is acting also on the weight body 10b of the balance weight 10. As a consequence, a moment acts on the balance weight 10 urging it to rotate about the pivot pin 13 in the clockwise direction as viewed in FIG. 2, whereby the centrifugal force acting on the balance weight is doubled and applied to the back face 3e of the master jaw 3. That is, the moment due to the centrifugal force acting on the balance weight 10 is applied in the direction counter to the moment due to the centrifugal force acting on the jaw 5. For this reason, the jaw-flotation phenomenon is prevented, and the decrease in jaw gripping force accompanying the chuck rotation is compensated for. Then, since the jaw-flotation phenomenon is thus prevented, and each jaw 5 is thus gripping the workpiece in its original unchanged state of gripping, the gripping force is returned to the original value when the rotation is stopped, and there is no possibility of the workpiece being deformed after the machining work.

In one experiment, a 6-inch chuck of the above described example was fabricated, and the decrease in gripping force with rotational speed and the final gripping force were measured. As a result, it was confirmed that the gripping force decreased slightly with increasing rotational speed, as indicated by curve d in FIG. 8, and returned with decreasing speed as indicated by curve e almost coinciding with the curve d, and that the final gripping force coincided with the initial gripping force. As will be apparent from a comparison of the curve d, in FIG. 8 and the aforementioned curve b in FIG. 9, the compensation of the gripping force afforded by the device of this invention for compensating for centrifugal force can be caused, by appropriately selecting the mass of the balancing weights, to be comparable to those of known balanced chucks.

Figure 1:
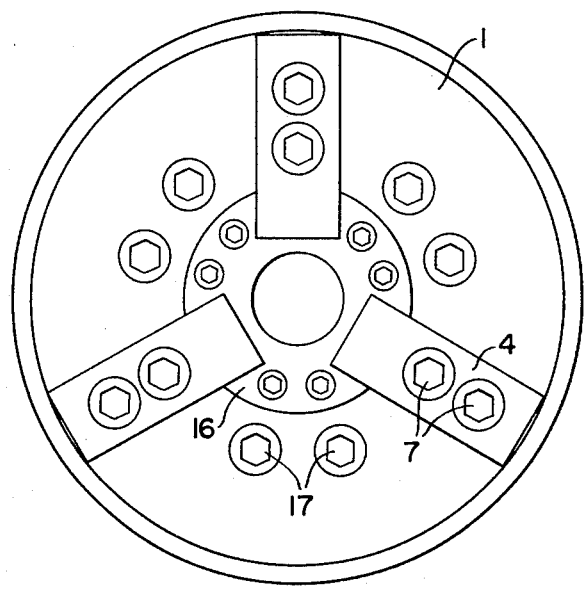
FIG. 1 is a front view of one example of a balanced chuck, constituting a preferred embodiment of this invention, in a state wherein it is not gripping a workpiece.
Figure 5:
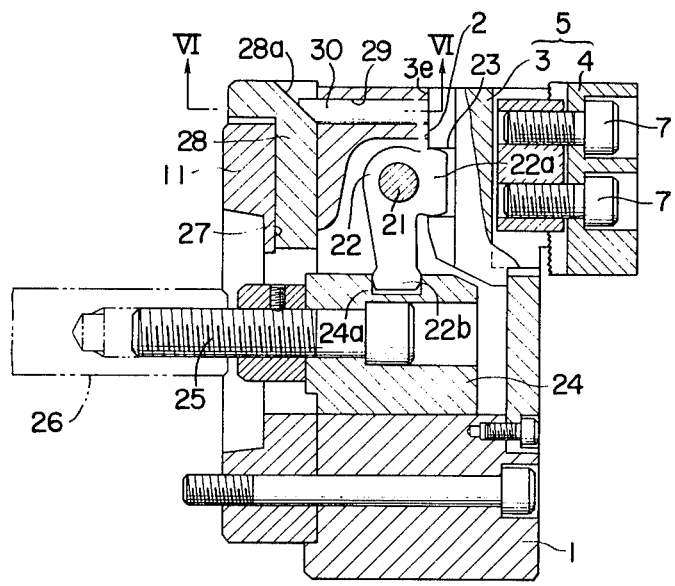
FIG. 5 is a side view, in longitudinal section showing another embodiment of the invention.
Figure 6:
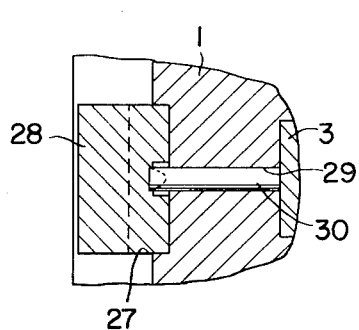
FIG. 6 is a fragmentary sectional view taken along the plane indicated by line VI—VI in FIG. 5 as viewed in the arrow direction.

Another embodiment of this invention in the form of a crank-type chuck will now be described in conjunction with FIGS. 5 and 6. As is known, in a crank-type chuck, each of a plurality of bell cranks 22 is pivoted at its central apex part on a fixed shaft 21 secured to the chuck body 1. The end 22a (actuating end) of one arm of this bell crank 22 is engaged with a recessed part 23 formed in the back face of each master jaw 3, while the other end 22b (actuated end) of the other arm is engaged with a recessed part 24a of a draw sleeve 24. This draw sleeve 24 is connected by a bolt 25 to a draw bar 26.

When the draw sleeve 24 is moved in its axial direction, the bell crank 22 is rotated about the fixed shaft 21, whereby the master jaw 3 is displaced inward or outward in the chuck radial direction. When each bell crank 22 is enclosed within the chuck body 1 to the rear of its master jaw 3 in this manner, it becomes difficult to pivotally support the balance weights as in the preceding embodiment of the invention illustrated in FIGS. 1 through 4.

Accordingly, weight mounting grooves 27 are formed in radial directions at equal angular intervals in the front face of a rear plate 11 to be placed against the rear side of the chuck body 1 at positions corresponding to respective master jaw mounting slots 2. This rear plate 11 is bolted onto the chuck body 1. Into each of these weight mounting grooves 27 is inserted a balance weight 28, which is thereby free to slide in the chuck radial direction. Each of these balance weights 28 is provided with an inclined surface 28a of 45-degree angle of inclination formed on its front face at its outer periphery.

A pin bore 29 is formed in the chuck body 1 to communicatively connect each master jaw mounting slot 2 and the corresponding weight groove 27 at a position near the outer periphery of the chuck body 1. In this pin bore 29, a push pin 30 is so inserted that it is free to slide in its axial direction, which is parallel to the chuck axis, the front end and beveled rear end of this push pin 30 respectively contacting the back face 3e of the master jaw 3 near the outer periphery thereof and the inclined surface 28a of the balance weight 28. This push pin functions to transmit a force due to centrifugal force acting on the balance weight 28 to the back face 3e of the master jaw 3.

In the instant embodiment of the invention, the weight mounting grooves 27 are provided at the front face of the rear plate 11 so as to facilitate conversion of an already installed chuck of crank type for application of the invention thereto, but an arrangement wherein these weight grooves are formed by machining in the rear face of the chuck body 1 and covered by the rear plate 11 may also be used. When a weight mechanism of a balance weight slider type of this character is used, each push pin 30 is pushed axially forward by the balance weight 28 under centrifugal force and, in turn, pushes forward the back face 3e of the master jaw 3 near the outer periphery thereof, this force being applied in a direction parallel to the axis of the chuck body. This action is desirable.

When it is desired to increase this forward force, the slope of the inclined surface 28a (as viewed in FIG. 5) is made steeper to increase the wedge action. Furthermore, the balance weight 28 is prevented from sliding radially out of the chuck as a result of centrifugal force solely by its engagement by the push pin 30. If this is undesirable from the standpoint of safety, a projection is formed on and integrally with the balance weight 28 and fitted in a safety groove for preventing escape of the weight formed in either the chuck body 1 or the rear plate 11.

In the device for compensating for centrifugal force of this invention as described above, the centrifugal force acting on each balance weight is applied to the back face of the corresponding master jaw near the outer periphery thereof thereby to push the master jaw forward and thereby to impart thereto a moment tending to rotate the jaw inward toward the chuck axis. Therefore, the aforementioned jaw-flotation phenomenon is prevented, and at the same time the decrease in the gripping force of the chuck accompanying rotation thereof is compensated for. Moreover, when the chuck rotation is stopped, the gripping force returns to the initial gripping force with which the workpiece was gripped in the beginning, and there is no deformation of the workpiece after working.

Accordingly, by rotating the workpiece at high speed, the working time is reduced, whereby the production cost can be lowered, and, at the same time, the precision of working the workpiece can be increased. Above all, the chuck of this invention makes possible high-speed rotation of fragile workpieces such as those of thin walls and light metal alloy castings which can be easily deformed or broken by excessive gripping force and is therefore optimally suitable for use as a chuck for high-speed rotation of various kinds of workpieces.

It should be understood, of course, that the foregoing disclosure relates to only two preferred embodiments of this invention and that they are intended to cover all changes and modifications of the examples of the invention herein chosen for the purposes of the disclosure, which do not constitute departures from the spirit and scope of the invention. For example, this invention can be applied to all known chucks in which the jaws are caused to slide in the radial direction by actuating means such as a fluid-pressure cylinder-piston mechanism so that the centrifugal force compensation device wherein balance weights move or slide in the radial direction as exemplified in the above described second embodiment of the invention can be employed in a wedge-type chuck as shown in FIGS. 1 through 4.

I claim:
1. A rotary chuck comprising:

a chuck body having an axis of rotation; and
a plurality of jaw mechanisms, each jaw mechanism including:
- a master jaw slidably supported by said chuck body for sliding in a radial direction relative to said axis and having a planar back face extending substantially radially relative to said axis near the radially outer periphery of said chuck body,
- a top jaw secured to said master jaw axially forward thereof and movable therewith in said axial direction,
- a balance weight supported in and rotatable with said body, for providing compensation for centrifugal force acting on said master jaw and top jaw during rotation of said chuck about said axis, and
- force transmitting means for transmitting the centrifugal force acting on said balance weight during rotation of said chuck body, in a forward direction substantially parallel to said axis to said back face near said radially outer periphery, said force transmitting means having an axially forward end in radial sliding contact with said back face near said radially outer periphery, said centrifugal force being transmitted to said back face through said forward end to press said master jaw and said top jaw only in an axially forward direction and thereby to impart a moment thereto urging said top jaw to rotate inward toward said axis.

2. A rotary chuck as in claim 1, wherein said chuck body has, for each jaw mechanism, a master jaw mounting slot, a weight mounting slot communicating with said master jaw mounting slot, and a weight accommodating chamber communicating with said weight mounting slot, each jaw mechanism having its balance weight located in said chamber and extending into said weight mounting slot, each jaw mechanism including a weight pivot pin mounted to said chuck body pivotally supporting said balance weight in said weight mounting slot, said balance weight having an end part in said weight mounting slot in abutment with said end face of said master jaw, said end part constituting said transmitting means.

3. A rotary chuck as in claim 1, wherein said transmitting means includes means for transmitting a force which is a multiple of said centrifugal force acting on said balance weight to said back face.

4. A rotary chuck as in claim 2, wherein said transmitting means includes means for transmitting a force which is a multiple of said centrifugal force acting on said balance weight to said back face.

5. A rotary chuck as in claim 1, wherein said chuck body has, for each jaw mechanism, a master jaw mounting slot and a weight mounting groove formed rearward of said jaw mounting slot, each jaw mechanism having its balance weight radially slidably mounted in said weight mounting groove, said balance weight having a first inclined surface inclined with respect to said axis formed at the front radially outer periphery thereof, said jaw mechanism including a push pin having an axially rear end second inclined surface contacting said first inclined surface of said balance weight and an axially front end abuttingly contacting said back face of said master jaw near the radially outer periphery thereof, said push pin constituting said transmitting means.

* * * * *